Nov. 11, 1930.  H. R. TEEGARDEN  1,781,650
METHOD AND APPARATUS FOR MAKING CABLE BEADS
Filed April 26, 1928
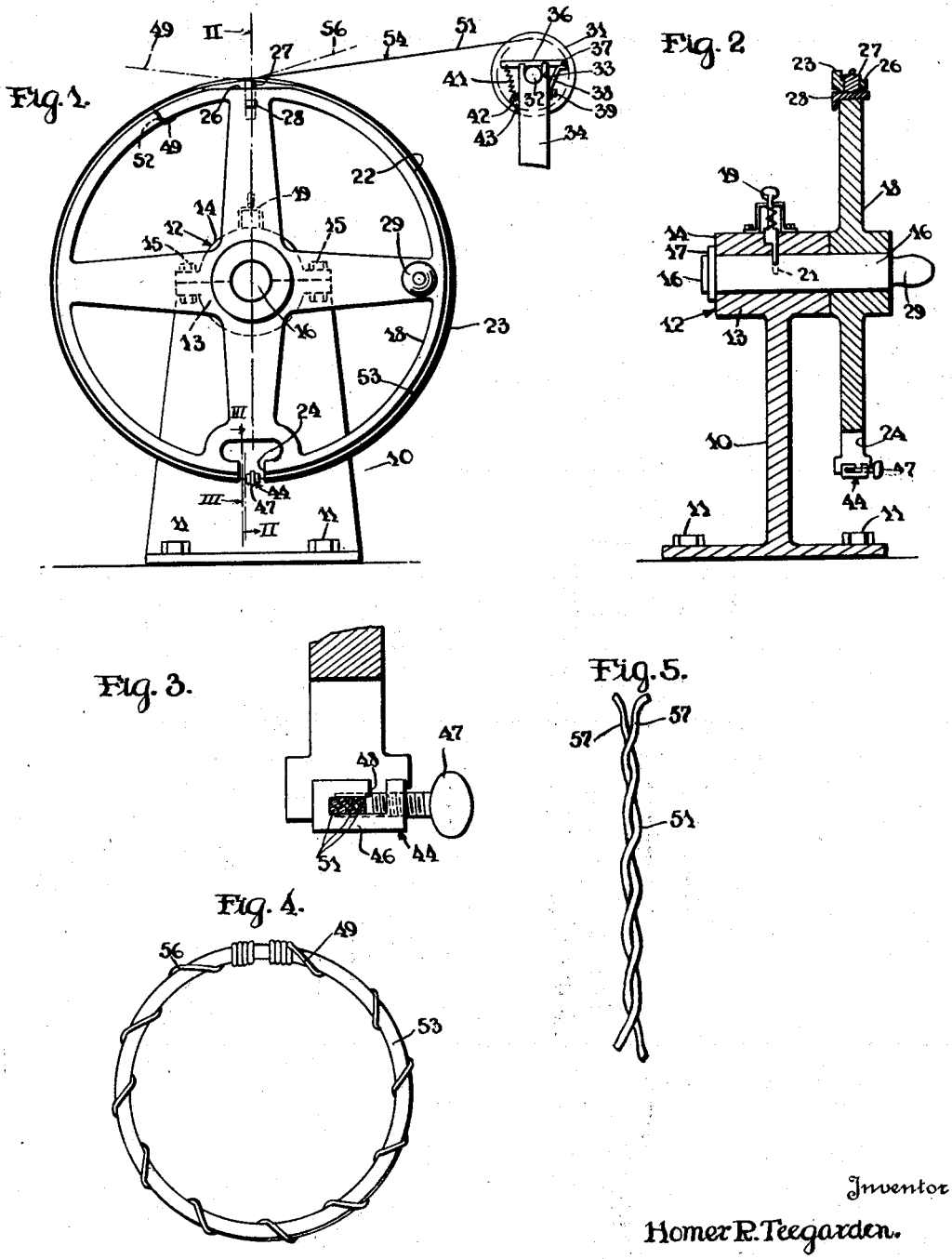
Inventor
Homer R. Teegarden.
By
Attorney Patented Nov. 11, 1930

1,781,650

UNITED STATES PATENT OFFICE

HOMER R. TEEGARDEN, OF AKRON, OHIO, ASSIGNOR TO THE GOODYEAR TIRE & RUBBER COMPANY, OF AKRON, OHIO, A CORPORATION OF OHIO

METHOD AND APPARATUS FOR MAKING CABLE BEADS

Application filed April 26, 1928. Serial No. 272,922.

The invention relates generally to bead rings employed in building pneumatic tire casings and has particular relation to a novel method of and apparatus for constructing wire cable beads of the above designated character.

An object of the invention is to provide a bead ring composed of a plurality of wire strands which are equally stretched in the finished product.

Another object of the invention is to provide a bead ring composed of a plurality of wire strands which are equally stretched and secured, substantially, against relative movement.

Another object of the invention is to provide a cable bead ring composed of a plurality of wire strands having interstices therebetween for accommodating rubber or other binding material within the several strands of the cable.

Another object of the invention is to provide a relatively economical and efficient method of and apparatus for constructing bead rings of the above designated character.

The invention comprises a bead ring which is constructed by winding a strand of wire or other suitable tension element, spirally, upon the outer surface of a bead forming reel. When a predetermined number of strands of wire are wound upon the reel, its rotation is discontinued and the strands are secured rigidly together by a screw-clamp which is projected partially below the surface of the reel within a recess formed therein. Then the supply strand is severed at a point remote from the leading end thereof in order to provide a substantially greater length of wire adjacent the two end portions than is required for spanning the reel. Thereafter, the cable is removed from the reel and the free portions of the wire are wound helically around the cable in opposite directions beginning at the point at which the clamp is secured. When the end portions of the wire meet at the side of the cable opposite the clamp, they are spliced together and wound around the remaining strands of the cable in any suitable manner. The cable may be constructed by employing a single strand of wire as a supply unit or a pair of strands may be twisted together and the bead partially or entirely constructed by employing such a unit as a supply strand.

For a better understanding of the invention, reference may now be had to the accompanying drawing, forming a part of this specification, in which:

Fig. 1 is a side elevational view of an apparatus for constructing wire cable beads, illustrating one embodiment of the invention;

Fig. 2 is a cross-sectional view of the apparatus illustrated in Fig. 1, taken substantially on line II—II of Fig. 1;

Fig. 3 is a fragmentary cross-sectional view on a larger scale, through a portion of the bead forming ring illustrated in Fig. 1 and taken substantially on line III—III thereof;

Fig. 4 is an elevational view of a cable bead ring embodying one form which the invention may assume; and Fig. 5 is an enlarged fragmentary view of a supply strand composed of a pair of twisted wires which may be employed in constructing beads for pneumatic tire casings.

An apparatus illustrating one embodiment of the invention comprises a pedestal 10, secured to the floor of a building by bolts 11, having a bearing portion 12 formed adjacent the upper end thereof. The bearing 12 is composed of an arcuate portion 13 formed integrally with an upper portion of the pedestal 10 and a cap 14 disposed oppositely with respect to the latter and secured thereto by means of bolts 15.

A short shaft 16, journaled in the bearing 12, is provided with a thrust ring 17, rigidly secured at one end thereof, to prevent its displacement in one direction within the bearing. On the opposite end of the shaft 16, a bead forming reel 18 is secured rigidly in abutting relation to the adjacent end of the bearing 12. A detent 19, mounted on an upper portion of the bearing cap 14, is adapted operatively to engage a radially disposed opening 21 which is formed intermediate the ends of the shaft 16. The outer periphery of the reel 18 is composed of a cylindrical portion 22 having a flange 23 projecting therebeyond which is formed at the side of the surface 22 adjacent the bearing 12.

A recess 24 is formed in the outer periphery of the reel 18 at a point which is substantially 180° from the radial opening 21 formed in the shaft 16. Diametrically across the reel 18 from the recess 24 the cylindrical surface 22 is flattened, as indicated at 26, and a block 27 is slidably disposed in a radial opening formed at an intermediate portion of the surface 26. The inner end of the block 27 is supported by a tapering pin 28 which, in turn, is slidably disposed in an opening formed in the reel 18 intersecting the lower portion of the opening in which the block 27 is mounted. A handle 29, projecting from the reel 18, provides means for rotating the latter when the detent 19 is disengaged with respect to the opening 21 within the shaft 16.

A supply reel 31 is provided with oppositely disposed trunnions 32, which are journaled in U-shape bearings 33 formed adjacent the upper ends of supporting frame members 34. A brake beam 36, an intermediate portion of which is adapted frictionally to engage one of the trunnions 32, is pivoted at one end upon a pin 37 secured in a bracket 38 that is bolted as indicated at 39 to one of the frame members 34. An opposite end portion of the beam 36 is connected by a spring 41 to a pin 42 which is mounted between a pair of lugs 43 projecting laterally from one side of the frame member 34.

A screw-clamp 44, employed in conjunction with the operation of the apparatus, is composed of a clamping eye 46 within which a set screw 47 is threaded. The set screw 47 is adapted to close an opening 48 communicating with the interior of the clamping eye 46 when projected within the latter.

In the operation of the apparatus, an end 49 of a wire supply strand or bead building unit 51 is secured in an opening 52 formed in the surface 22 of the reel 18 at a point a substantial distance beyond the block 27. The detent 19 is withdrawn from the opening 21 and the reel is rotated in an anti-clockwise direction by manipulation of the handle 29. When the required number of strands of the wire 51 are positioned around the surface 22 of the reel 18 adjacent the flange 23, the reel again is secured rigidly against rotation by operative engagement of the detent 19 within the opening 21. All of the strands of the cable 53 thus formed are secured rigidly together by inserting the clamp 44 partially within the recess 24 and tightening the set screw 47 upon the strands after they are surrounded by the eye 46.

The supply strand is severed, by any suitable cutting device (not shown), at a point 54 a substantial distance from the block 27, thus forming a second end portion 56 of the wire 51 composing the cable 53. After removing the end 49 of the wire 51 from the opening 52, the tapered pin 28 is removed from beneath the block 27, thus permitting the latter to move inwardly with respect to the surface 26. Then the cable 53 is removed manually from the reel 18 and beginning at points adjacent the clamp 44, the opposite end portions 49 and 56 of the wire 51 are wound helically in opposite directions about semi-circular portions of the cable. Thereafter the ends 49 and 56 are twisted together in any suitable manner and wound in closely disposed convolutions about an adjacent portion of the cable thus forming a relatively non-yielding splice. Any surplus wire is cut from the ends 49 and 56 and the clamp 44 is disengaged from the cable.

The bead cable thus formed may be applied in building pneumatic tire casings directly according to certain known methods of constructing them or it first may be encased in a rubber or rubberized fabric jacket, or both, before being employed in the construction of such articles of manufacture.

As best shown by Fig. 5, a preferred form of the invention contemplates the employment of a wire strand or bead building unit 51, composed of a pair of wires 57, which are twisted together before the bead building unit is wound upon the reel 31. A bead ring may be constructed of this bead building unit as hereinbefore described or in any other desirable manner.

From the foregoing description, it is apparent that the invention embraces a very economical and efficient method of and apparatus for constructing wire cable beads that differ fundamentally from the beads heretofore employed. A pneumatic tire casing embodying beads constructed according to the principles of this invention obviously will not be subject to bead failures resulting from unequally tensioned strands. It is also aparent that a bead constructed by employing a bead building unit composed of twisted strands of wire will be easily impregnated during a molding process by the rubber of which the pneumatic tire casing is partially composed.

Although I have illustrated but the preferred forms which the invention may assume and have described those forms in detail, it will be apparent to those skilled in the art that the invention is not so limited but that various modifications may be made therein without departing from the spirit of the invention or from the scope of the appended claims.

What I claim is:

1. A method of constructing tire beads which comprises spirally winding a portion of a tension member to form an endless cable and helically winding the cable with a remaining portion of the tension member.

2. A method of constructing tire beads which comprises spirally winding a portion of a tension member upon a cylindrical surface to form an endless cable, securing the strands of the tension member composing the cable rigidly with respect to each other, and helically winding a remaining portion of the tension member around a portion of the cable.

3. A method of constructing tire beads which comprises twisting a pair of tension members together to form a bead building unit and then forming a bead cable from the unit.

4. A method of constructing tire beads which comprises twisting a pair of tension members together to form a bead building unit, forming the unit into an endless cable and wrapping the cable helically with a portion of the unit.

5. A bead building apparatus comprising a reel for receiving bead wire from a supply reel mounted adjacent thereto and means independent of the first mentioned reel for securing strands of a cable, constructed thereupon, rigidly together.

6. A bead building apparatus comprising a drum having an opening within the outer periphery thereof, means for forming a cable composed of a plurality of wire strands upon the drum, and means independently associated with the opening for securing the strands of the cable rigidly together.

7. A bead building machine comprising a reel for supporting an endless bead cable thereupon, a block projecting above the surface of the reel against the cable, and means for releasing the block.

8. A bead building apparatus comprising a reel having a flattened portion and a gap in the outer periphery thereof, a block positioned on said flattened portion, means for displacing the block, and means associated with said gap for securing strands of wire rigidly together.

In witness whereof, I have hereunto signed my name at Akron, in the county of Summit and State of Ohio, this 25 day of April, 1928.

HOMER R. TEEGARDEN.